Patented Nov. 9, 1926.

1,605,928

UNITED STATES PATENT OFFICE.

VIGGO DREWSEN, OF LARCHMONT, NEW YORK.

PROCESS OF TREATING WASTE SODIUM-SULPHITE LIQUORS.

No Drawing.   Application filed October 9, 1922.   Serial No. 593,410.

This invention relates particularly to processes of treating the waste liquors which are produced in the digestion of wood, straw, cornstalks, or other fibrous material with sodium monosulphite or other sodium sulphite cooking liquors so as to recover the valuable inorganic constituents of such liquors and prepare the cooking liquors for reuse. Niter cake is a cheap and desirable source of sodium and sulphur which may be used with advantage to replace the usual loss of these elements in monosulphite cooking liquors, and the niter cake, or crude acid sodium sulphate, may be mixed or combined with the waste liquor preferably in connection with more or less quick lime or other calcium compound. The niter cake, preferably in neutralized or causticized combination with lime or other alkaline material, may be advantageously incorporated in the concentrated waste cooking liquor before or during the incineration of the liquor in the rotary burners. The usual niter cake or crude acid sodium sulphate may be advantageously causticized and converted into powdery condition by agitating or combining a concentrated solution such as about a seventy percent solution with about half its weight of powdered quick lime. This causes a vigorous reaction with evolution of considerable steam, so that a finely divided powder is usually produced which has an alkaline character. This neutralized niter cake usually consists of about thirty percent of sodium sulphate, about thirty percent of calcium sulphate and about forty percent of calcium hydrate.

This powdered neutralized or causticized niter cake may be continuously fed into the rotary incinerator furnace preferably together with sufficient powdered caustic lime to combine with the sulphurous acid radical of the sodium sulphite in the waste liquor, so as to minimize the vaporization or elimination of sulphur-dioxide during the incineration of the material, and about one molecule of quick lime is sufficient for each molecule of the sodium sulphite used in the original cooking liquor. The amount of causticized niter cake incorporated at this stage of the process is of course dependent on the loss of chemicals in the original cooking liquor which usually amounts to ten to twenty percent or so of the chemicals used. These powdered materials may be continuously fed, as by a screw conveyor, into the concentrated waste liquor in the upper part of the rotary burner for instance, where any soluble component such as sodium sulphate dissolves in the hot liquor and is finally reduced to sodium sulphide, the calcium sulphate present being similarly reduced to calcium sulphide by the reducing atmosphere of the furnace. This sodium sulphide reacts with the lime present and the combustion gases in the furnace, so as to form calcium sulphide and sodium carbonate, which fuses with the calcium sulphide so as to flow from the front end of the furnace for collection. After this fused mixture has cooled it crumbles in the air and the sodium carbonate can then be readily leached out and recombined with sulphur-dioxide to form the sodium monosulphite used for the cooking liquor. The remaining calcium sulphide may then be treated in finely divided condition while suspended in water by percolating carbon-dioxide through this liquor which produces hydrogen sulphide which may be burned in the air to form sulphur dioxide for combination with the sodium carbonate solution to form the sodium monosulphite as above described. The waste monosulphite cooking liquor may thus be renewed according to this process and all the elements may be restored from this cheap crude niter cake which supplies the soda in desirable form and also supplies therewith an excess amount of sulphur, so that ample sulphur is usually available for combination with the soda to form the monosulphite desired.

This invention has been described in connection with a number of illustrative materials, proportions, conditions, arrangements, and orders of steps, to the details of which disclosure the invention is not of course to be limited, since what is claimed as new and what is desired to be secured by Letters Patent is set forth in the appended claims.

I claim:

1. The process of treating waste liquor from the sodium monosulphite process of cooking wood, straw or other fibrous material, which comprises concentrating the waste liquor, incorporating therewith a mixture of quick lime and crude niter cake which has been causticized with powdered quick lime to convert the acid sodium sulphate thereof into sodium sulphate and calcium sulphate, and burning the mixture in a rotary incinerator to effect the reduction of the sulphates and form a fused mixture of calcium sulphide and sodium carbonate, leaching the sodium carbonate out of the mixture, suspending the calcium sulphide in finely divided condition in water and percolating carbon-dioxide therethrough to form hydrogen sulphide, burning the hydrogen sulphide into sulphur dioxide and combining the same with the sodium carbonate to form sodium monosulphite for a new charge of cooking liquor.

2. The process of treating waste liquor from the sodium monosulphite process of cooking wood, straw or other fibrous material, which comprises concentrating the waste liquor, incorporating therewith a mixture of quick lime and crude niter cake which has been causticized with quick lime to convert the acid sodium sulphate thereof into sodium sulphate and calcium sulphate, and burning the mixture to form a fused mixture of calcium sulphide and sodium carbonate, leaching sodium carbonate out of the mixture, suspending the calcium sulphide in finely divided condition in water and percolating carbon-dioxide therethrough to form hydrogen sulphide, burning the hydrogen sulphide into sulphur dioxide and combining the same with sodium carbonate to form sodium monosulphite for a new charge of cooking liquor.

3. The process of treating waste liquor from the sodium monosulphite process of cooking wood, straw or other fibrous material, which comprises concentrating and incorporating with the waste liquor a mixture of powdered quick lime and crude niter cake which has been causticized with powdered quick lime, burning the mixture in a rotary incinerator to eliminate water and organic matter therefrom and effect the reduction of the sulphates and form a fused mixture of calcium sulphide and sodium carbonate, leaching sodium carbonate out of the mixture, and suspending the calcium sulphide in finely divided condition in water and percolating carbon-dioxide therethrough to form hydrogen sulphide, burning the hydrogen sulphide into sulphur dioxide and forming sodium monosulphite therefrom.

4. The process of treating waste liquor from the sodium monosulphite process of cooking wood, straw or other fibrous material, which comprises concentrating and incorporating with the waste liquor a mixture of an excess of lime and crude niter cake which has been causticized with powdered quick lime, burning the mixture to eliminate water and organic matter therefrom and effect the reduction of the sulphates and form a fused mixture of calcium sulphide and sodium carbonate, and leaching sodium carbonate out of the mixture.

5. The process of treating waste liquor from the sodium monosulphite process of cooking wood, straw or other fibrous material, which comprises concentrating the waste liquor, incorporating therewith niter cake which has been causticized with an excess of powdered quick lime and agitating and burning the mixture and effecting the reduction of the sulphates and forming a fused mixture of calcium sulphide and sodium carbonate, recovering sodium carbonate from the mixture and combining therewith sulphur-dioxide produced from such calcium sulphide.

6. The process of treating waste liquor from the sodium monosulphite process of cooking wood, straw or other fibrous material, which comprises concentrating the waste liquor, incorporating therewith niter cake which has been combined with an excess of lime and agitating and burning the mixture and effecting the reduction of the sulphates and forming calcium sulphide and sodium carbonate, recovering sodium carbonate from the mixture and combining therewith sulphur-dioxide.

7. The process of treating waste liquor from the sodium monosulphite process of cooking wood, straw or other fibrous material, which comprises incorporating with the waste liquor a reaction product of niter cake and excess lime and agitating and burning the mixture to effect the reduction of the sulphates and form calcium sulphide and sodium carbonate, and forming sodium monosulphite therefrom.

VIGGO DREWSEN.